June 27, 1967 C. B. CONVERSE 3,327,968
AIRCRAFT TOWED UNDERWATER SKIP PROBE
Original Filed July 22, 1964 2 Sheets-Sheet 1
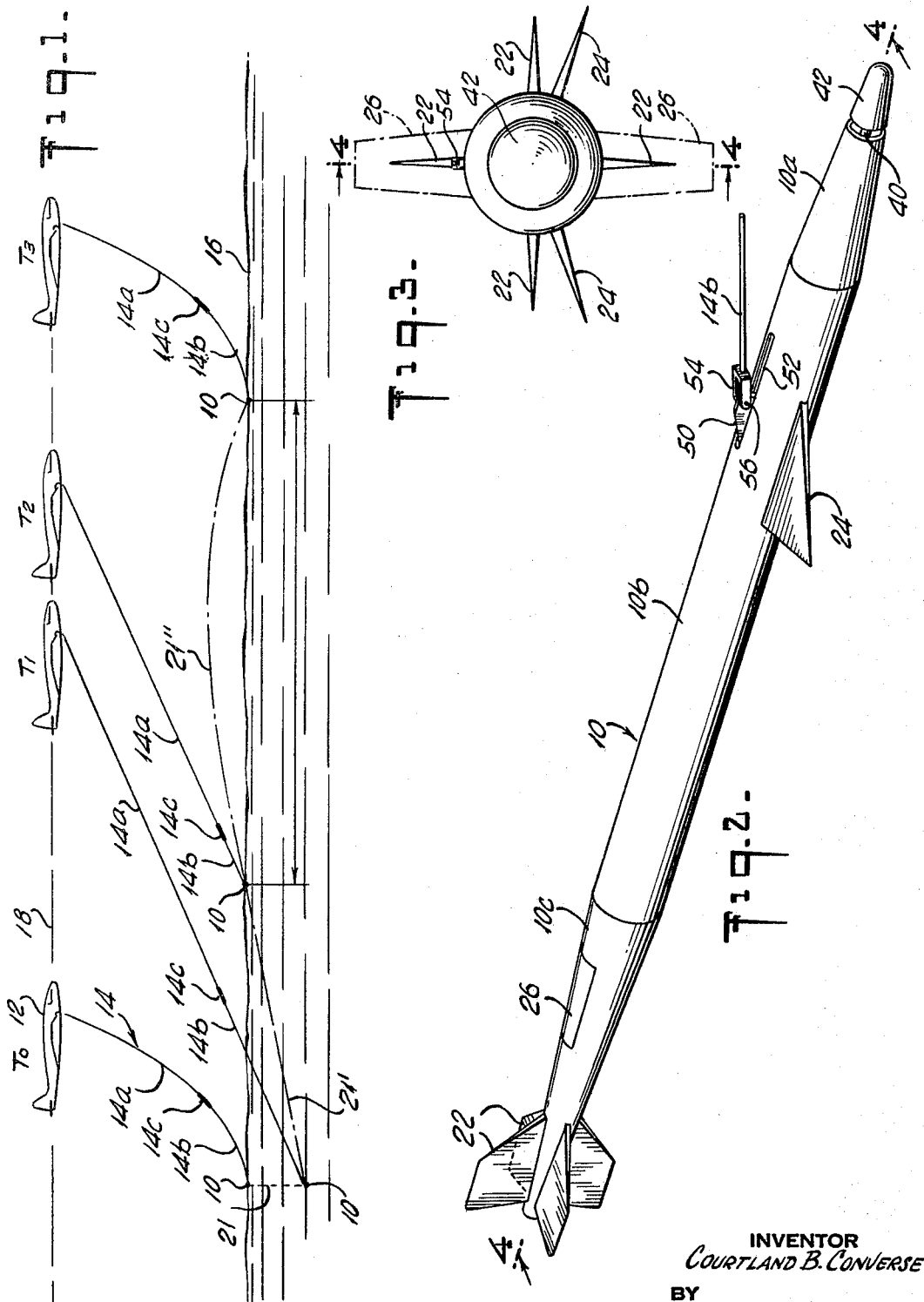
INVENTOR
COURTLAND B. CONVERSE
BY
Nolte & Nolte
ATTORNEYS

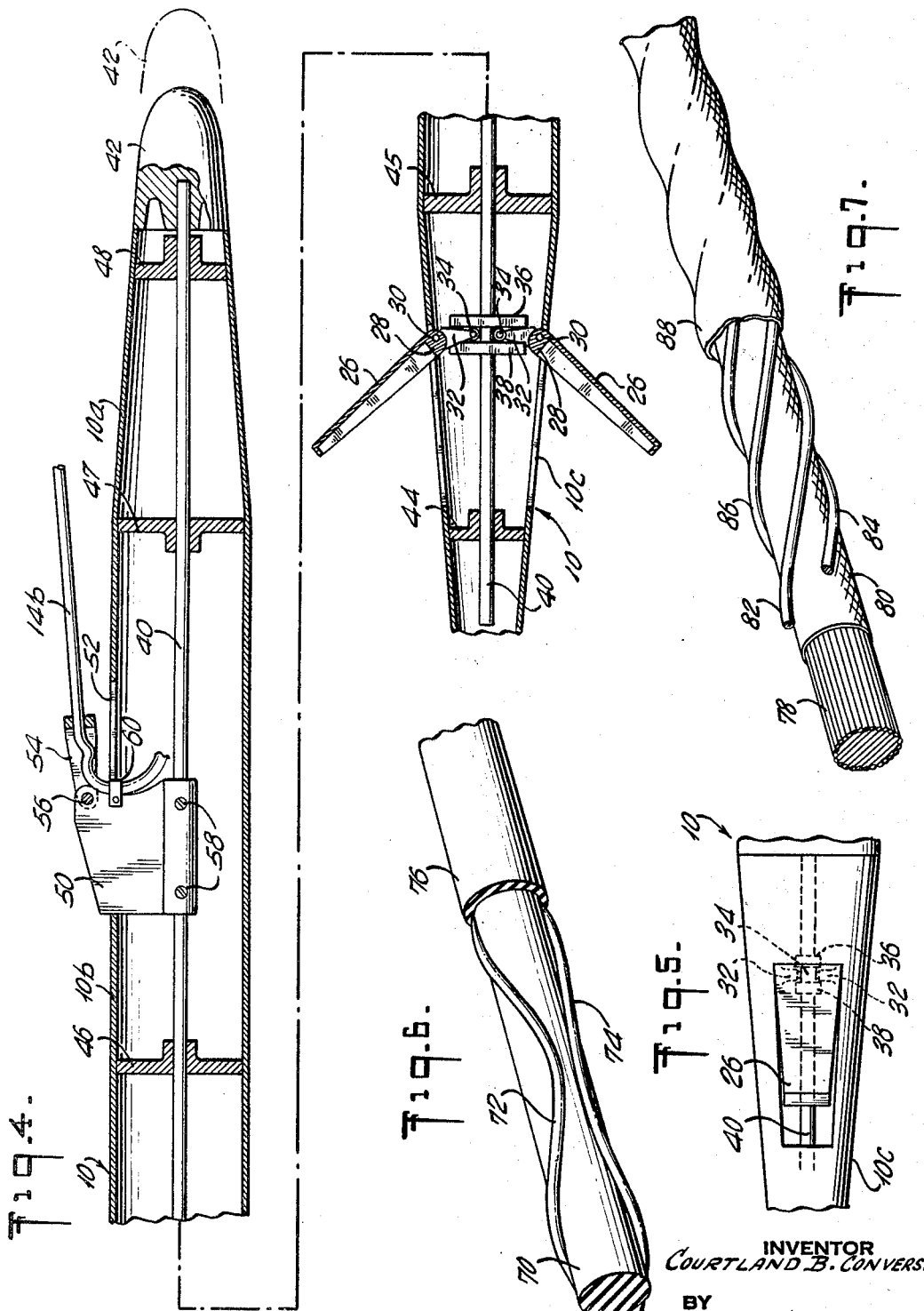

United States Patent Office 3,327,968
Patented June 27, 1967

3,327,968
AIRCRAFT TOWED UNDERWATER SKIP PROBE
Courtland B. Converse, Marion, Mass., assignor, by mesne assignments, to Francis Associates, Inc., Marion, Mass., a corporation of Massachusetts
Continuation of application Ser. No. 384,438, July 22, 1964. This application Apr. 1, 1966, Ser. No. 544,653
12 Claims. (Cl. 244—3)

This invention relates to the acquisition of data by underwater sensing devices, and, in particular, to the acquisition of such data by means of an air-towed underwater probe.

This application is a continuation of application Ser. No. 384,438, filed July 22, 1964, and now abandoned.

The determination of various properties of the ocean is important in many military and commercial applications. Properties such as salinity, temperature, density, and underwater noise affect the propagation of acoustic energy through water, and therefore affect the performance of systems which depend upon the transmission of sonar energy for the translation of data. To obtain the required information relative to such properties, a great number of measurements must be taken over a relatively large area, and therefore the measurement rate is an important consideration. Similarly, when searching for the presence of submarines by means of sonar devices, it is desirable to "sample" the largest area of water in the shortest possible period of time.

In all of the above cases, the utility of prior art oceanographic devices has been limited by the speed at which the various measurements can be taken. The maximum speed of a boat is an obvious limitation, and, moreover, when operating from a rapidly moving surface vessel, the acoustic noise generated by the vessel deleteriously affects the operation of sonar devices. To overcome this drawback, it has been proposed to incorporate sonar devices in probes which are "dunked" from helicopters. The hovering helicopter provides a quite environment for operation of the sonar equipment, while its relatively high cruising speed may be used to sample large areas of the water. However, even a helicopter system is limited as to the rate at which measurements can be made and the relatively short range of a helicopter.

Accordingly, it is an object of the present invention to provide a method and apparatus for obtaining underwater data more rapidly than heretofore possible.

A more specific object of the invention is to provide a method and apparatus for obtaining underwater data from an air towed probe.

Another object of the invention is to provide a method and apparatus for obtaining underwater data in which the low noise advantage of a helicopter system is maintained, while the sampling rate is materially increased.

Still another object is to provide an improved probe for use in obtaining underwater data at high speeds.

Briefly, the invention includes a probe, designed to obtain the desired data, towed on an elastic cable by an airplane. When the cable is slack, the probe falls slowly through the water, during which time the desired data is obtained. As the airplane continues to move in a straight line, the cable becomes tensioned and stretches, thus storing potential energy. The tensioned cable exerts a force on the probe which accelerates it up through the water. Once free from the water, the potential energy on the cable is imparted to the probe so that it accelerates to a high degree and "flies" out of the water to a new location, at which the cable again is slack. The cycle continues to repeat in a stable manner.

The manner in which the above and other objects of the invention are accomplished is more fully described below with reference to the attached drawings wherein:

FIG. 1 is a schematic diagram of the probe cable and airplane indicating the manner in which the invention operates;

FIG. 2 is a perspective view of a preferred embodiment of the probe;

FIG. 3 is a front view of the probe illustrated in FIG. 2;

FIG. 4 is a sectional view along the line 4—4 of FIGS. 2 and 3;

FIG. 5 is a top view of the rear portion of the probe;

FIG. 4 is a perspective view of one type of elastic cable useful with the invention; and FIG. 7 is a perspective view of a second embodiment of an elastic cable.

In the following specification and claims, the invention is not to be construed as limited to the acquisition of any specific type of data. The invention would have particular utility in an anti-submarine system in which sonar pings are emitted, and their reflections heard during the free fall period of the probe's descent. However, the invention would have equal utility in measuring properties of the water such as temperature, salinity, etc., by means of conventional sensing devices such as thermistors or the like. In the following specification, neither the location of the data receiving circuitry nor the placement of the required transducers has been illustrated in the drawings, since these are matters of mere technical expedience to those skilled in the art.

FIG. 1 is a schematic diagram of the invention showing its mode of operation during a normal cycle. In accordance with the invention, a probe 10 is connected to an aircraft 12 by means of an elastic cable 14. Elastic cable 14 may comprise conventional cable portions 14a and 14b, between which is sandwiched a highly resilient section 14c. A body of water is illustrated at 16 and the flight path of aircraft 12 shown as a solid line 18 through the longitudinal axis of the plane.

In FIG. 1 four different positions of the aircraft cable and probe are shown. The cycle is considered to start at time T0 at which point the aircraft is at the extreme left of FIG. 1, probe 10 at the surface of water 16, and cable 14 in a slack condition between aircraft 12 and probe 10, with resilient portion 14c in its normal or non-stretched condition.

During the first portion of this cycle, probe 10 descends vertically along the path indicated by dotted line 21. The vertical descent of the probe comprises the data acquisition portion of the cycle and occurs as the probe effectively free falls through the water. During this period the desired data is obtained and returned to the aircraft via the cable, or it may instead be recorded by suitable means in the probe itself.

While the probe is descending, aircraft 12 continues along its path 18 to a position indicated at time T1. At time T1, resilient cable portion 14c has been extended to its maximum length. At this time, the potential energy stored in the tensioned portion 14c starts to accelerate the probe to a velocity considerably above that of the aircraft 12, and the probe moves along path 21' to the surface of the water, which it reaches at time T2. Due to the great differential in the density of sea water and air, the acceleration of the probe as it leaves the water at time T2 will cause the probe to "fly" ahead of aircraft 12 in a ballistic trajectory 21" and again land in the water at time T3 to repeat the free fall and data acquisition period. The next cycle continues from time T3 in the identical manner.

The actual collection of the desired data forms no part of the present invention and therefore is not described herein. If required, pressure transducers or similar triggering mechanisms can be used to activate the sonar equipment or sensing devices within the probe at specified depths.

The invention above described is not limited to a particular type of cable, nor is it limited to a particular probe; however, FIGS. 2–5 illustrate a novel probe of particular utility in the invention illustrated in FIG. 1. As explained in detail hereinbelow, the probe includes special provisions to prevent its free-falling descent through the water from generating noise which would interfere with data collected by sonar equipment.

The probe comprises a torpedo shaped fuselage including conically shaped front and rear sections 10a and 10c, respectively, joined by a cylindrical central section 10b. The rear section 10c of the fuselage includes four stabilizing fins 22 positioned in quadrature to help stabilize the probe during its free falling descent. At the forward portion of central fuselage section 10b a pair of downwardly canted triangular fins 24 similarly guide the probe during its ascent. The manner in which fins 22 and 24 exert a stabilizing influence on the probe is conventional.

If, during the measuring portion of the cycle, the probe descends vertically into the water at too high a rate of speed, the noise signals generated may interfere with the operation of sonar equipment within the probe. Accordingly, in a preferred embodiment, the probe includes a unique braking mechanism to retard the probe's descent during the data acquisition period of the cycle, without reducing the speed of the probe during its upward travel through the water under the influence of the elongated elastic cable section 14c. The braking mechanism might also serve to control the probe's rate of descent in the event it is desired to record the property sensed by the probe as a function of depth.

According to the invention, the braking mechanism comprises two oppositely disposed rectangular plates 26 shaped to fit flush within complementary windows of the rear fuselage section 10c. Plates 26 include inwardly extending flanges 28, and are pivotally secured to the fuselage by means of pins 30 passing through suitable apertures in the forward portions of flange 28 and cooperating portions of fuselage section 10c.

The brake plates 26 include elongated members 32 extending inwardly from the forward end of flange 28. At the inner extremity of each member 32 there is a follower 34 which is actuated by one of plates 36 or 38 to apply or remove the braking force.

Plates 36 and 38 are secured to a longitudinal rod 40 which extends axially through the probe 10 and terminates in a blunt nose piece 42 at the forward extremity of the probe. Nose piece 42 is blunted to stabilize the probe at impact and for a short time thereafter by preventing re-exit characteristics and skipping. Rod 40 is slidably mounted in five central discs 44, 45, 46, 47 and 48 of the probe 10. A generally rectangular plate 50 is slidable in a slot 52 within central probe section 10b. Cable portion 14b is coupled through the crosspiece of a U-shaped bracket 54 pivotally secured to plate 50 by means of pin 56. Plate 50 is immovably fixed to the rod 40 by means of screws 58 or the like. A clip 60 secures the cable portion 14b to the plate 50, and the cable is introduced into the central portion of the probe so that the cable may be used to transmit the received data back to the plane.

During operation, and prior to the descent of probe 10 along path 21, the nose piece 42 is forward in the position illustrated in dashed lines in FIG. 4. In this position, plate 50 is pulled to the forward portion of slot 52, and plate 38 pushes followers 34 forward so that the brake plates 26 are closed, i.e. flush with the fuselage surface. When the probe descends into the water, the impact of the nose piece 42 and the water pushes the nose piece and rod 40 backwardly to the illustrated solid line position. When this occurs, plate 36 pushes followers 34 backward, pivoting the brake plates 26 open. The open plates abruptly brake the descent and the probe falls during the data acquisition portion of the cycle at a substantially reduced rate of speed to appreciably limit the noise signals generated.

When plane 12 reaches the position indicated at time T1 in FIG. 1, and the elongated elastic cable portion 14c begins to pull the probe 10 toward the surface, the cable pulls plate 50 and rod 40 forward with respect to the probe body so that nose piece 42 returns to the dotted line position. In this position, plate 38 pushes followers 34 forward causing the brake plates 26 to pivot back into the body of the probe. Hence, during the upward movement of the probe through the water, the brake plates exert no impeding force upon the probe's movement. The brakes remain closed until the nose piece 42 again strikes the surface of the water at time T3 and the cycle repeats.

There are various types of cable which may be used as the elastic portion 14c. Cable portions 14a and 14b may be conventional non-stretchable cable, and there are commercially available elastic cables which will suffice for the cable portion 14c. Two preferred embodiments of the elastic cable portion are illustrated in FIGS. 6 and 7.

In FIG. 6, the cable includes an elastic core 70, made of rubber or the like, with wires 72 and 74 helically wound in opposite directions over its outer surface. Wires 72 and 74, together with central core 70, are enclosed in an annular elastic casing 76 which also may be made of rubber. When the cable illustrated in FIG. 6 is tensioned, the helical wires 72 and 74 stretch to a relatively straight configuration to accommodate the elasticity of the core 70 and casing 76.

The cable illustrated in FIG. 7 is similar to that of FIG. 6. In this embodiment, the cable comprises a plurality of tightly packed elastic bands 78 covered by an elastic fabric 80. Three wires 82, 84 and 86 are coiled around the tube thus formed and enclosed in a second elastic fabric 88. When the cable is stretched, the wires elongate in the manner of a tensioned coil spring.

The aircraft 12, in addition to including the electronic equipment necessary to trigger and receive data from the probe, must include a winch or the like to deploy and retrieve the cable and probe. It is necessary that when the probe reaches the water there be sufficient cable left to permit the cycle described above to commence. At high speeds, a winch drum could be used to deploy the wire axially from the end of the drum. If the cable and probe can be deployed slowly, a standard target winch, such as those used in naval aircraft gunnary systems, could be employed.

By way of example only, the entire cable may be approximately 5000 feet long, 164 feet of which is the elastic portion 14c with a spring constant of 6.85 pounds per foot. The probe selected may have the same drag properties as a sphere 6 inches in diameter. The plane may be travelling at a speed of about 100 knots at an altitude of 656 feet. Under these conditions, the probe will sink to a depth of about 80 feet in approximately 11 seconds with the cycles repeating every 2500 feet.

Although a preferred embodiment of the invention has been shown and described, the invention is not so limited and should only be defined by the following claims.

What I claim is:

1. A method of obtaining data within a body of water from a moving aircraft, comprising the steps of towing a probe from the aircraft on a cable having elastic properties, permitting said probe to periodically fall through the body of water while obtaining such data and causing said cable to be stretched elastically by a substantial amount to accelerate the probe out of the body of the water and to cause the same to leap through the air to another location in the body of water.

2. A method according to claim 1, including the step of braking the probe when it is falling through the water.

3. A method according to claim 2, including the step of removing the braking force when the probe is rising through the water under the influence of the tensioned cable.

4. A method of obtaining data from within a body of water by a probe towed by a moving aircraft, comprising the steps of towing the probe from the aircraft by means of a cable having elastic properties, permitting said probe to fall through the water while obtaining such data and simultaneously stretching the cable a substantial amount to accelerate the probe out of the water and to another location at which point the cable is slack, and again permitting the probe to fall through the water until the cable is stretched said substantial amount.

5. A method according to claim 1, including the steps of braking the probe when it is falling through the water, and removing the braking force when the probe is rising through the water under the influence of the tensioned cable.

6. Apparatus for acquiring data by a moving aircraft from a body of water, comprising a sensor and means being elastic to a substantial degree and adapted to be secured to the aircraft for towing the sensor for periodically immersing said sensor in the body of water and for accelerating said sensor through the air to a new immersion location at a speed greater than the speed of said aircraft.

7. Apparatus for acquiring data from an aircraft towed probe within a body of water, comprising a probe and an elongated cable secured directly to one end portion of said probe, the other end portion of said cable being adapted to be secured to said aircraft, at least a portion of said cable being elastic to a substantial degree so that stretching of the cable during movement of the aircraft is sufficient to accelerate the probe out of the water and to another location.

8. Apparatus according to claim 6, wherein said probe includes means for braking the fall of the probe through the water.

9. Apparatus according to claim 8, including means for removing the braking force when the probe is accelerated upwardly through the water.

10. Apparatus according to claim 7, wherein said elastic portion of the cable includes an elastic core and at least one wire wound on said core for transmitting a signal.

11. A probe for obtaining aquatic data, comprising an elongated body portion, at least two brake plates pivotally secured to said body portion and normally flush therewith, a forward nose piece axially slidable with respect to said body portion, and a connecting member between said nose piece and said brake plates whereby movement of said nose piece toward said body portion pivots said brake plates away from said body portion.

12. A probe according to claim 11, wherein said connecting member includes actuating means and said brake plates include means extending into the path of movement of said actuating means.

References Cited
UNITED STATES PATENTS

| | | | |
|---|---|---|---|
| 2,590,131 | 3/1952 | Schonstedt | 244—3 |
| 3,159,806 | 12/1964 | Piasecki | 114—235 X |

MILTON BUCHLER, *Primary Examiner.*

T. MAJOR, *Assistant Examiner.*